United States Patent
Taylor et al.

(10) Patent No.: US 7,222,731 B2
(45) Date of Patent: May 29, 2007

(54) LATERALLY ADJUSTABLE CONVEYOR

(76) Inventors: John S. Taylor, 4660 Overlook La., Blairsville, GA (US) 30512; Thomas W. Barrett, 722 Sunnyside Rd., Hiawassee, GA (US) 30546

(*) Notice: Subject to any disclaimer, the term of this patent is extended or adjusted under 35 U.S.C. 154(b) by 0 days.

(21) Appl. No.: 11/455,034

(22) Filed: Jun. 16, 2006

(65) Prior Publication Data

US 2006/0231373 A1     Oct. 19, 2006

Related U.S. Application Data

(63) Continuation of application No. PCT/US04/37063, filed on Nov. 4, 2004.

(60) Provisional application No. 60/530,502, filed on Dec. 18, 2003.

(51) Int. Cl.
*B65G 21/12* (2006.01)
(52) U.S. Cl. .................................................. 198/861.2
(58) Field of Classification Search .............. 198/861.2
See application file for complete search history.

(56) References Cited

U.S. PATENT DOCUMENTS

| | | | | |
|---|---|---|---|---|
| 3,796,296 A | * | 3/1974 | Bakker | 198/735.6 |
| 3,920,115 A | * | 11/1975 | Craggs | 198/822 |
| 4,144,965 A | | 3/1979 | Alldredge et al. | |
| 4,618,057 A | | 10/1986 | Howser | |
| 4,773,528 A | | 9/1988 | Anderson et al. | |
| 5,031,752 A | * | 7/1991 | Rostowski et al. | 198/735.6 |
| 6,032,781 A | * | 3/2000 | Ballestrazzi et al. | 198/369.4 |
| 6,705,461 B2 | * | 3/2004 | Kuharevicz et al. | 198/861.1 |
| 2004/0011628 A1 | * | 1/2004 | Koeda et al. | 198/839 |

* cited by examiner

*Primary Examiner*—Mark A. Deuble
(74) *Attorney, Agent, or Firm*—Kenneth S. Watkins, Jr.

(57) ABSTRACT

A laterally adjustable conveyor utilizes a belt support assembly consisting of a plurality of pivoting support plates connected by pivots for sliding support of a flexible belt. A plurality of support stands provide support for the pivot plates from the floor or other supporting surface. A belt drive provides motive power for the flexible belt. A lateral adjustment assembly provides a means to position the back end laterally with respect to the front end of the conveyor by rotating pivot plates about plate pivots.

20 Claims, 8 Drawing Sheets

LATERALLY ADJUSTABLE CONVEYOR

This is a continuation application claiming the benefit of and International Application No. PCT/US2004/037063 filed 04 Nov. 2004 claiming benefit of U.S. Provisional Application No. 60/530,502 filed 18 Dec. 2003.

FIELD OF THE INVENTION

The present invention relates to conveyors and, more particularly, conveyors in which the lateral or horizontal position of the conveyor is adjustable.

BACKGROUND OF THE INVENTION

Conveyors are used in a large variety of manufacturing, poultry, agricultural, and distribution applications where conveying bulk material or articles is required. Many applications require the in feed or out feed locations to be changed. Considerable labor is often required to re-configure conveyors for the required path.

Prior conveyor designs have been disclosed to make the conveyor run adjustable. For example, U.S. Pat. No. 4,144,965 discloses a flexible conveyor track assembly utilizing segmented rails forming upper and lower runs to the conveyor. The segments have tongues and recesses aligned with the runs. This and other designs have proven complex and have not gained wide use.

OBJECTS AND SUMMARY OF THE INVENTION

Therefore, an object of the present invention is to provide a conveyor that is adjustable in the lateral or horizontal direction.

Another object of the present invention is to provide a conveyor in which the lateral position can be changed quickly and easily by a powered positioner.

Another object of the present invention is to provide a conveyor in which allows vertical as well as horizontal adjustment of the run.

Yet another object of the present invention is to provide a conveyor in which is simple and low in cost.

The conveyor of the present invention utilizes a belt support assembly having a front support plate and a back support plate connected by a number of pivoted support plates. The pivoted support plates are angled with respect to the longitudinal and transverse directions in order to allow pivoting the plates with respect to each other without overlap. Support stands, connected by pivoting links and supported by wheel assemblies support alternating pivot support plates of the belt support assembly. The wheeled support stands allow longitudinal and lateral positioning or the belt support assembly. A flexible belt made of interlocking segments is slideably supported from the support plates by belt retainer segments attached to each of the pivot support plates.

A belt drive attached to the front support plate drives the flexible belt by use of a motor driving a cogged drive roller through a gear reducer. An idler roller mounted to the back plate provides turning and support for the belt at the back end of the conveyor. A lateral adjustment assembly turns the conveyor to the desired lateral position by respectively tightening a belt stretching between the end support plates on one side of the support assembly and loosening a second belt on the opposite side of the support assembly. A vertical height adjustment mechanism adjusts the height of the support assembly from the support stands to adjust the height of any portion of the conveyor.

In the preferred embodiments, the conveyor utilizes a segmented plastic belt with interlocking segments that allows lateral curvature of the belt. In the preferred embodiments, low friction retainer blocks attached to the pivot plates and end plates provide vertical and lateral sliding support to the flexible belt.

BRIEF DESCRIPTION OF THE DRAWINGS

These and other features, aspects and advantages of the present invention will become better understood with regard to the following description, appended claims and accompanying drawings where:

DESCRIPTION OF THE PREFERRED EMBODIMENTS

The following is a description of the preferred embodiments of a laterally adjustable conveyor, which can be easily adjusted to change the path of the conveyor.

Figure 1:
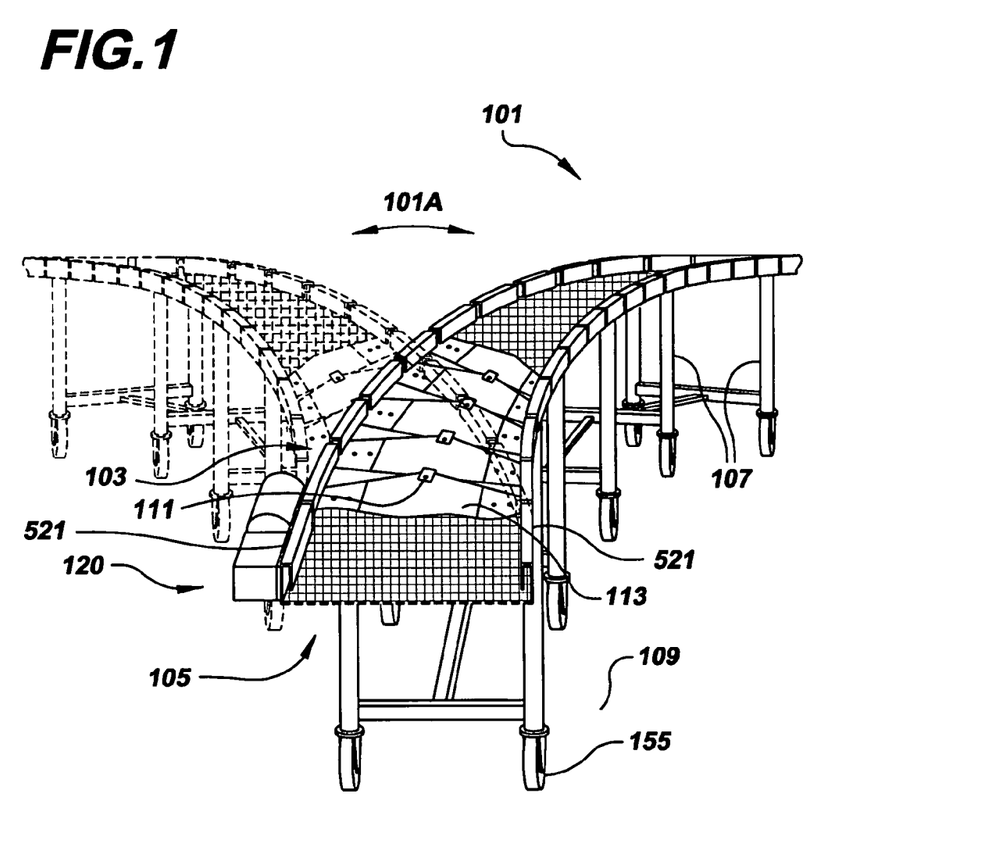
FIG. 1 is a perspective drawing of the laterally adjustable conveyor of the present invention showing the belt support assembly, flexible belt with a portion removed to show the pivot plates of the belt support assembly, support stands with wheel assemblies and the belt drive.

FIG. 1 is a perspective drawing of embodiment 101 of a horizontally or laterally adjustable conveyor utilizing a pivoting belt support assembly 103, flexible belt 105, support stands 107 and belt drive assembly 120. Pivots 111 of support or pivot plates 113 allow the belt support assembly 103 to move horizontally as shown in the phantom lines of FIG. 1 and arrow 101A. Support stands 107 provide support from the floor 109 or other support surface and wheel assemblies 155 provide longitudinal and lateral movement of the support stands. Flexible belt 105 is shown partially removed for clarity. The lateral adjustment assembly of FIGS. 2–4 is not shown for clarity.

Figures 2, 2A:
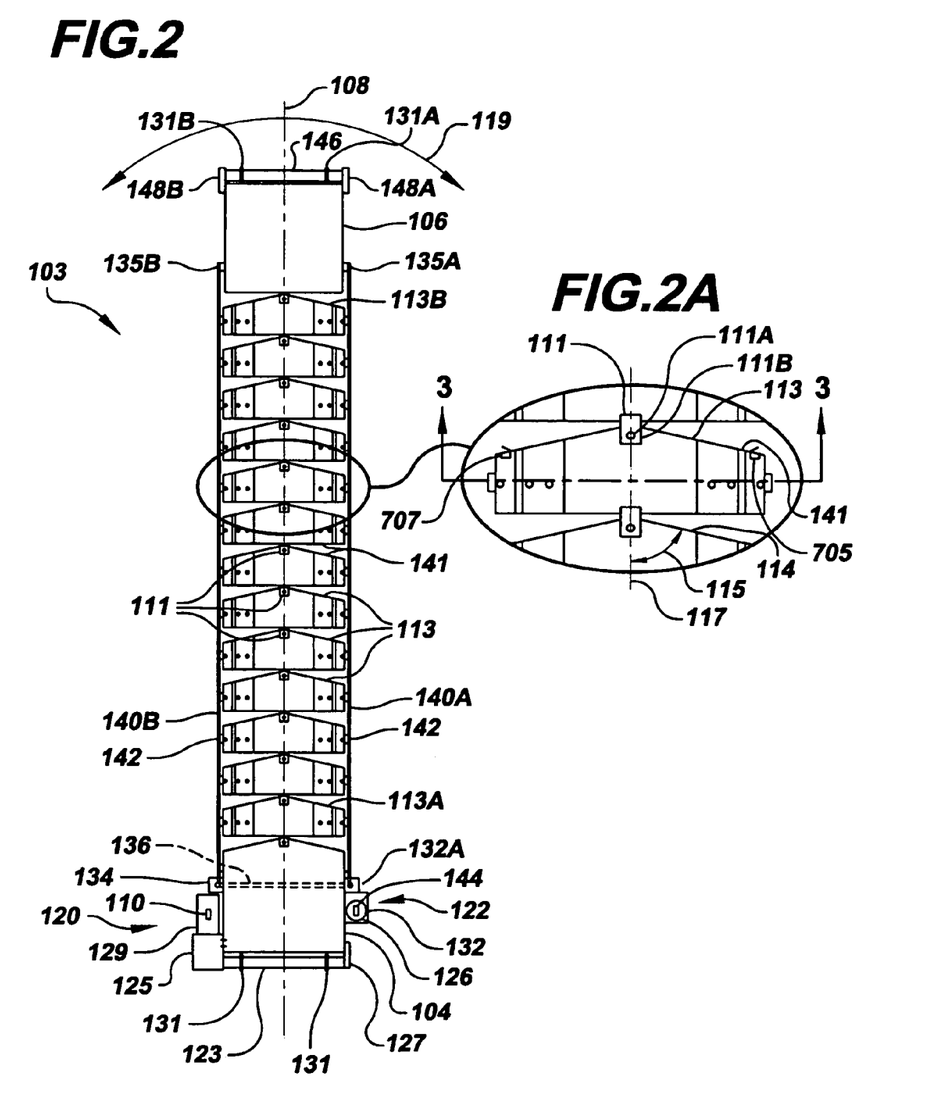
FIG. 2 is a plan view of the belt support assembly showing the drive end support plate, idler end support plate and the pivot support plates pivotally connecting the end plates, the belt drive lateral adjustment assembly and the belt drive.
FIG. 2A is a detail plan view of a pivot support plate with clevis and pivot pin pivotally connecting the pivot support plate to an adjacent pivot plate.

FIG. 2 is a plan view of belt support assembly 103 showing drive end support plate 104 at one end of belt support assembly 103 and idler end support plate 106 at the other end of the belt support assembly. A plurality of pivot plates 113 connected by pivots 111 connect drive end plate 104 to idler end plate 106 and define a longitudinal direction 108 between the end plates. Pivots 111 comprise a pivot pin 111A, best shown in detail plan view FIG. 2A, inserted into clevis 111B attached to the back portion of the adjacent pivot plate. In the preferred embodiments, pivot plates 113 are trapezoidal shaped having angled portions 114 forming an acute angle 115 with pivot centerline 117.

Angled portions allow pivot plates 113 to pivot without interference or contact with adjacent pivot plates and allow support assembly 103 to deflect laterally right or left in the plan view as shown by arrow 119. Drive end support plate 104, attached to the first pivot plate 113A provides structure for mounting of a belt drive assembly 120 and lateral adjustment assembly 122. Drive 120 comprises drive roller 123 supported by right angle reducer 125 and bearing bracket 127. Drive motor 129 provides drive power to drive roller 123 through reducer 125. Drive cogs 131 of drive roller 123 engage segments of flexible belt 105 to provide longitudinal translation of belt 105. A drive motor switch 110, connected to motor 129 windings and an AC power source, provides convenient starting and stopping of belt drive 120

Lateral adjustment assembly 122 comprises a reversible motor 126, driving a lateral adjustment belt pulley (130A of FIG. 4) through a gear reducer 132. Gear reducer 132 comprises a right-angle takeoff 132A driving a second right angle gear reducer 134 through cross shaft 136. Lateral adjustment belts 140A, 140B driven from respective lateral adjustment pulleys 130A, 130B provide a pulling force on one side of idler support plate 106 at respective attachment points 135A, 135B. The opposite belt, wrapped oppositely around its respective lateral adjustment pulley loosens as adjustment motor 126 is activated. The tightened belt produces a levering force on idler end support plate 106 with respect to pivots 111 and produces the resultant lateral movement of belt support assembly 103.

Belt support loops 142 in support stands 107 retain respective lateral positioning belts 140A, 140B to the respective plates but allow longitudinal movement of the belt. A momentary three-position switch 144 provides a convenient means to activate motor 126 in either direction to adjust conveyor 101 to the desired right or left lateral position.

Idler end support plate 106, pivotally connected to end pivot plate 113B provides support for idler roller 146 through bearing brackets 148A, 148B. Cogwheels 131A, 138B provide transverse and longitudinal stability to flexible belt 105 at the end of the conveyor.

Figure 3:
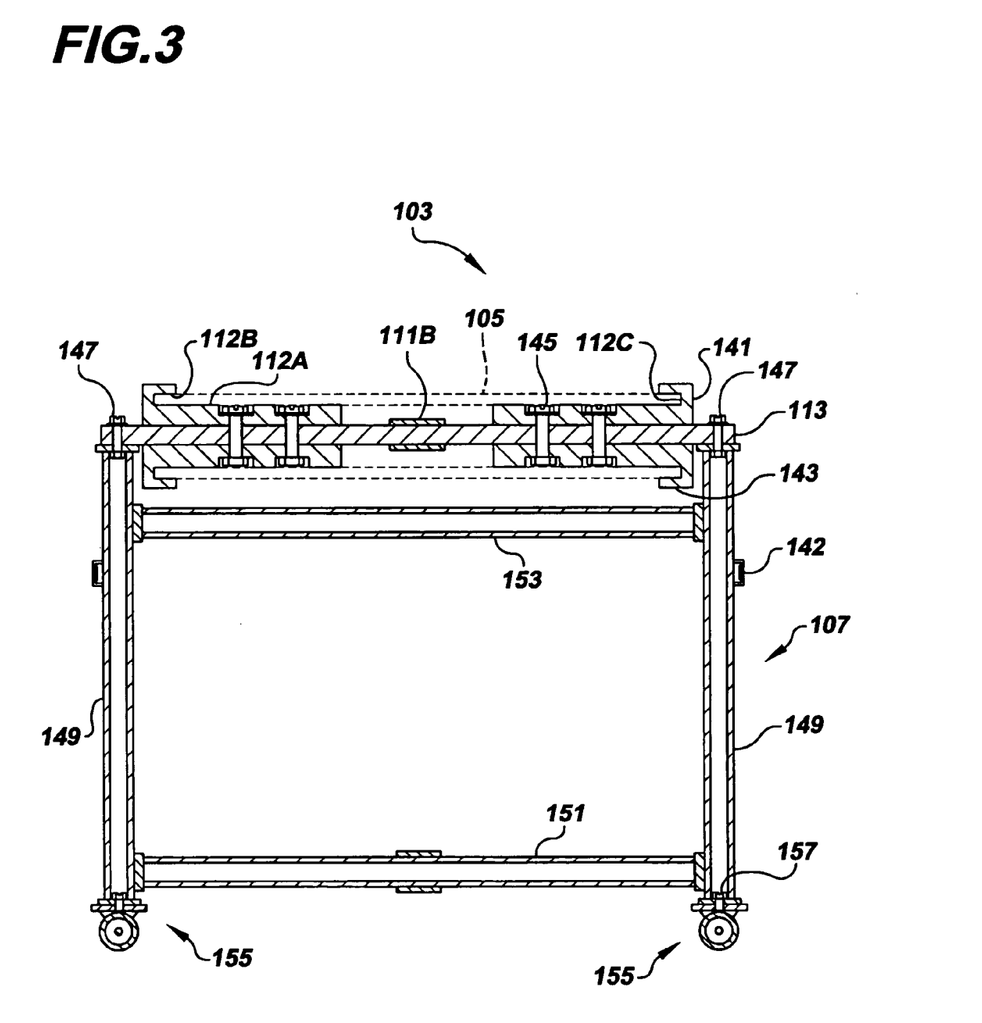
FIG. 3 is a cross section elevation drawing of the conveyor taken along lines 3—3 of FIG. 2A showing the top and bottom J-shaped belt retainers attached to the pivot plate, support stands and wheel assemblies.

FIG. 3 is an elevation cross section drawing of the conveyor taken along lines 3—3 of FIG. 2A. Top belt support members or retainers 141 and bottom belt retainers 143, attached to pivot plates 113, support flexible belt 105 shown in the phantom lines. In the preferred embodiments, belt retainers 141, 143 have a generally J-shape cross-section to retain the edges of flexible belt 105 laterally and vertically. Support surface 112A supports top belt section 105 for downward loads, while support surface 112B of retainer 141 provides support of belt 105 edges from upward loads, such as those which would occur in curved portions of the conveyor run.

Support surface 112C provides support for belt 105 edges from lateral or transverse loads generated by the curved path of the conveyor. The J-shaped cross-section of retainers 141, 143 provide the vertical and lateral constraint necessary to maintain belt stability for all conveyor paths and loads. In a similar manner, bottom retainer 143 provides upward support for bottom belt 105 run. In the preferred embodiments, belt retainers 141, 143 are extruded from a material having low friction and good abrasion properties such as ultra high molecular weight polyethylene (UHMWPE). Cap screws 145, recessed below the vertical support surfaces 112A, fix retainers 141, 143 to pivot plate 113.

Cap screws 147 attach pivot plate 113 to column 149 of support stand 107. Transverse beams 151, 153 provide strength and rigidity to support stand 107. Wheel assemblies 155, attached to the bottom of support columns 149 provide a low friction means to reposition support stand 107. Pivot screws 157 allow wheel assemblies 155 to swivel to provide lateral and longitudinal repositioning of support stand 107. In other embodiments, other low-friction devices may be substituted for wheel assemblies 155 such as roller assemblies, roller balls, or low-friction pads. Brakes (not shown) may be used to lock the position of the support stands. Clevis 111B provides a close-clearance pivoting attachment to the adjacent pivot plate.

Figure 4:
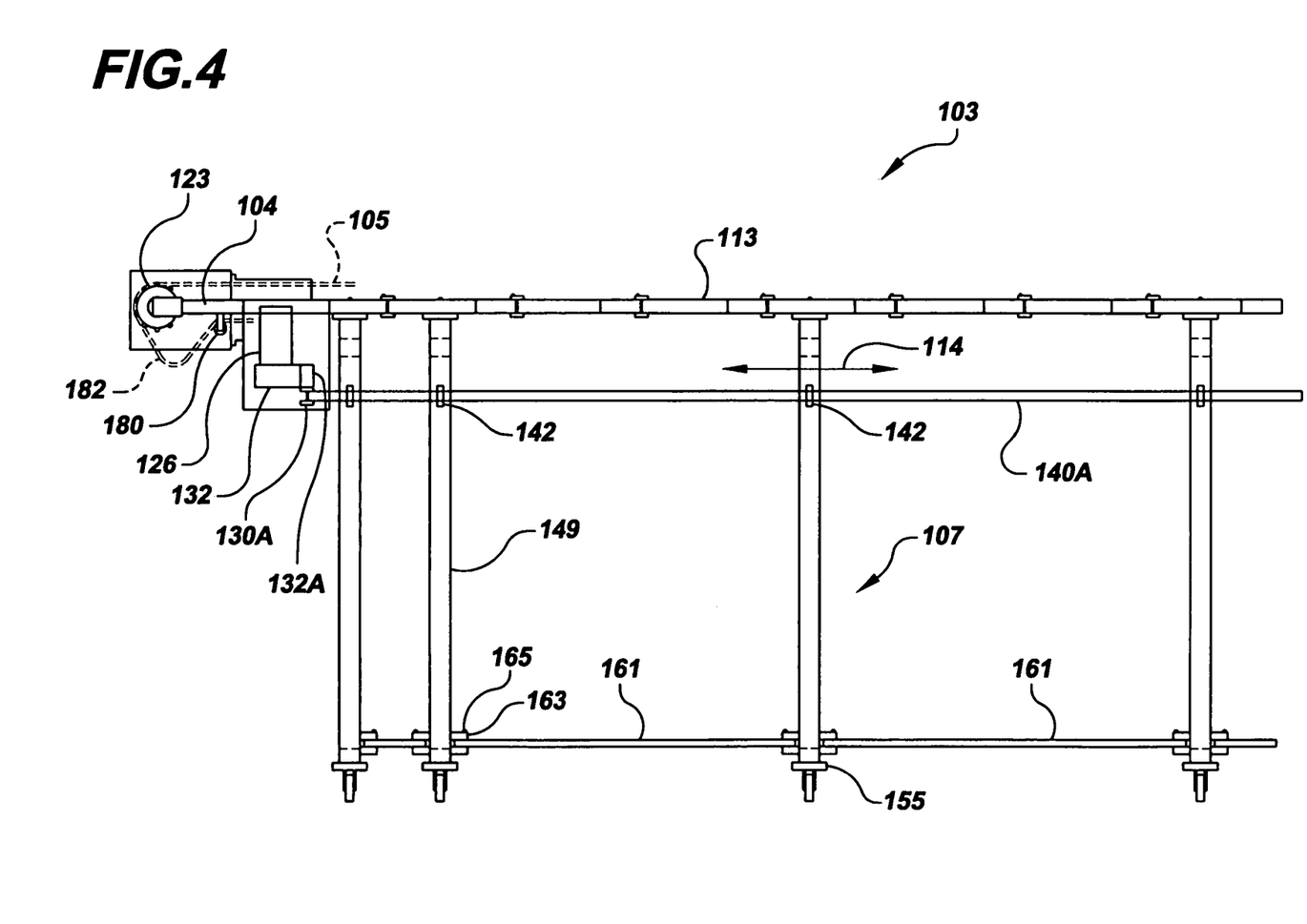
FIG. 4 is a side elevation drawing of the drive end support plate assembly and several pivot plates and support stands and the lateral adjustment assembly attached to the drive end support plate.

FIG. 4 is a side elevation drawing of the drive portion of belt support assembly 103 and support stands 107 of conveyor 101. Portions of flexible belt 105 and belt retainers 141, 143 are omitted for clarity. In the preferred embodiments, support stands 107 are attached in an alternating or repeating pattern to plates 113 such as every third support plate as shown in the figure. In other embodiments, support stands 107 are provided for every second or every fourth or higher number of pivot plates. In still other embodiments, a support stand is provided for every pivot plate. Support from a support stand is not required for each pivot plate since the small clearance between the adjacent pivot plate and pivot clevis 111B upper and lower portions (see FIG. 3) provide vertical support to the adjacent pivot plates.

Support stands 107 are connected by pivoting links 161, connected to support stand devises 163 by pivot pins 165. Pivoting links 161 maintain spacing of the respective support stands 107 and allow transverse motion of the support stands.

Lateral positioning belt 140A is laterally constrained by belt support loops 142 on support columns 149. Lateral positioning belt 140A is free to move in a longitudinal direction as shown by arrow 114.

Belt return roller 180 provides support for the bottom belt 105 run and guides belt 105 into the bottom retainers 143 of FIG. 3. Return roller 180 compensates for the slack loop 182 in belt 105 that results when the conveyor is positioned in a straight line.

Figure 5:
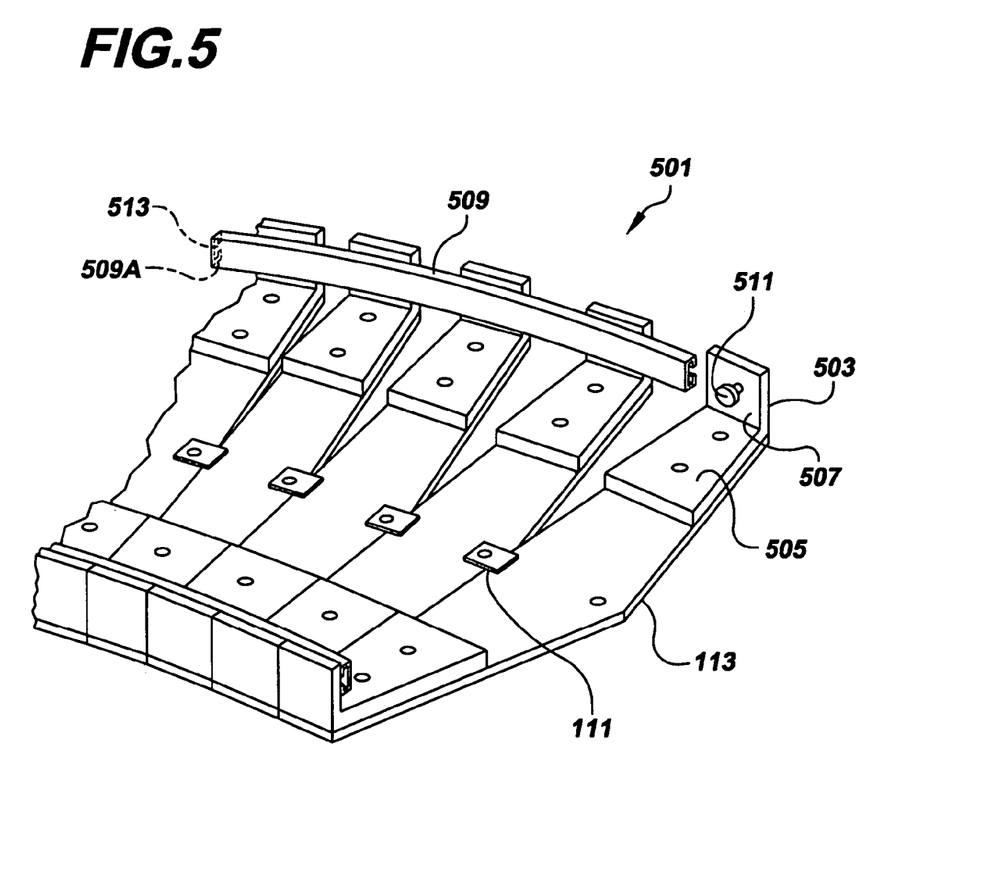
FIG. 5 is a detail perspective drawing of an alternative belt support assembly portion utilizing L-shaped belt retainers attached to the pivot plates for bottom and lateral support of the belt and a flexible retainer strip slideably supported from the L-shaped retainers for downward support of the upper belt portion, the lower belt retainers not shown for clarity but mirror images of the upper retainer components.

FIG. 5 is an alternative embodiment of a flexible belt retainer assembly 501 for the belt support assembly 103 of FIGS. 1–4. Segment L-shaped retainers 503 provide downward and lateral support to flexible belt 105 (not shown for clarity) through vertical support surface 505 and lateral support surface 507 similar to that of retainers 141, 143 of FIG. 3. Upward support or restraint of belt 105 is provided by bottom surface 509A of longitudinal strip retainer 509.

Strip 509 is slideably retained to segment retainers 503 by pins 511. The heads of pins 511 slideably engage channel 513 of retainer 509 and allow pivot plates 113 to pivot without straining or buckling retainer strip 509.

Support surface 509A of retainer strip 509 provides downward support the edges of belt 105 top run and upward support of the edges of the belt 105 bottom run and ensures that belt 105 is retained in a stable manner by the belt support assembly. In the preferred embodiments, retainer strip 105 is extruded of UHMWPE. In the preferred embodiments, pin 511 of the center segment retainer 503 is fixed to retainer strip 509. The ends (not shown) of retainer strip 509 are allowed to penetrate and withdraw from channels at the drive and idler end plates 104, 106, as shown by channels 521 of FIG. 1. Lower retainers (not shown, but mirror images of the upper belt retainer components) provide support for the lower belt run.

Figure 6:
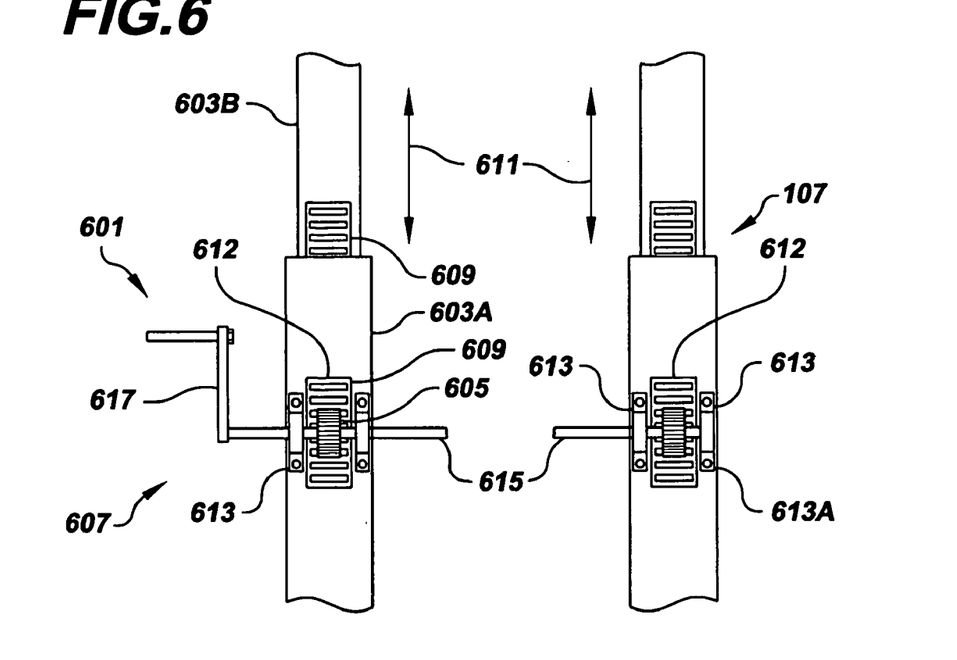
FIG. 6 is a detail front elevation drawing of an embodiment utilizing telescoping support columns of the support stands of the conveyor to provide vertical height adjustment of the belt run.

FIG. 6 is a front detail elevation drawing of an alternative embodiment of support stands 107 having a height adjustment mechanism 601. Height adjustment mechanism 601 utilizes telescoping legs or columns 603A, 603B for supporting belt support assembly 103 of the conveyor. Pinions 605 of pinion drive assembly 607 engages racks 609, attached to telescoping columns 603B to raise or lower column sections 603B as shown by arrows 611.

Opening 612 in columns 603A allows engagement of pinions 606 to racks 609 of columns 603B. Bearing blocks 613 rotatably support cross shaft 615 to column portions 603A. Pinions 605 are fixed to cross shaft 605. Fasteners 613A attach bearing blocks 613 to columns 603B. Crank 617, attached to cross shaft 615 provides the motive power for telescoping column 613B adjustment.

Figure 7:
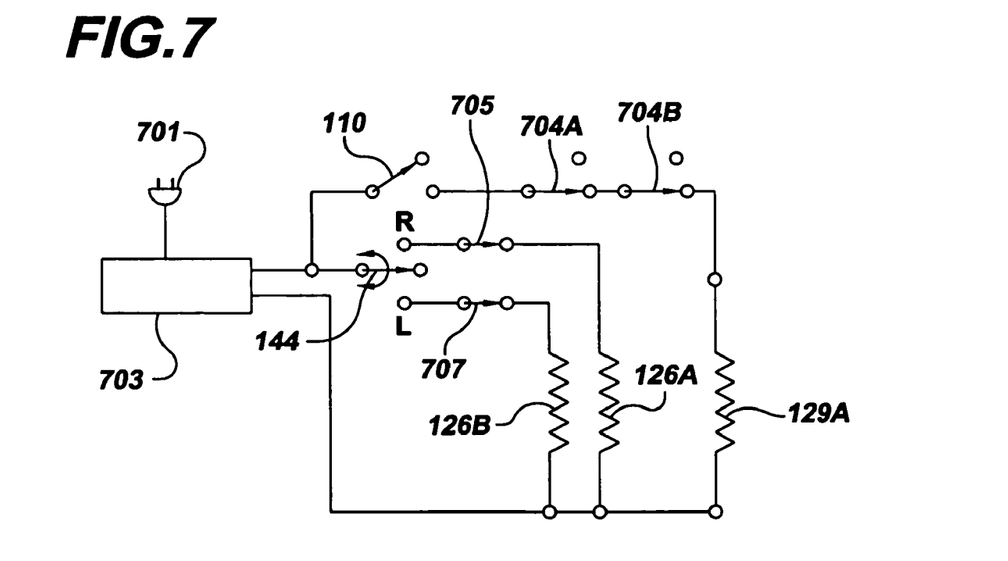
FIG. 7 is an electrical schematic diagram of the conveyor showing control components for the conveyor drive and positioning motors.

FIG. 7 is a schematic diagram of the electrical connections for the conveyor. Drive motor winding 129A is energized from AC power source 701 through junction box 703, normally open drive motor switch 110, and normally closed emergency-stop switches 704A, 704B.

The right lateral position winding 126A of reversible motor 126 is energized by AC power source 701 through junction box 703, momentary three-position switch 144, and right limit switch 705. The left lateral position winding 126B of reversible motor 126 is energized by AC power source 701 through junction box 703, momentary three-position switch 144, and left limit switch 707. Momentary switch 144 is biased on the center (off) position, requiring operator action to position the conveyor. Limit switches 705, 707 prevent equipment damage by de-energizing the respective winding of motor 126 before the conveyor locks in an extreme position. Limit switches may be mounted on pivot plates 113 as shown in FIG. 2A, or on brackets attached to adjacent support stands.

Figure 8A:
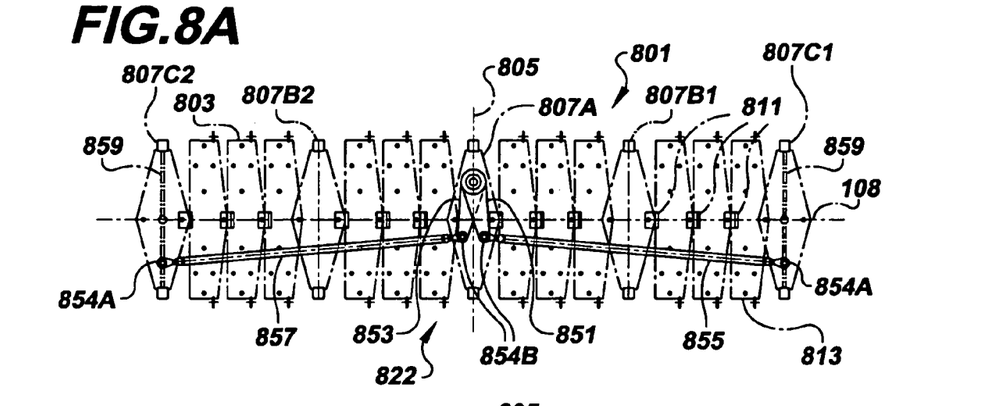
FIGS. 8A, 8B, and 8C are plan views of an alternative embodiment of a lateral drive assembly for a conveyor showing the lateral drive assembly positioned for a straight, convex and concave conveyor position, respectively.

FIG. 8A is a plan view of an alternative embodiment 822 of the lateral adjustment assembly of conveyor 801 comprising pivot arms 851, 853 connected to support stands 807C1, 807C2 by pivot connectors 854A, 854B of respective connecting rods 855, 857. In the preferred embodiments, pivot arms 851, 853 are mounted on counter rotating shafts of a differential drive 861 fixed to center support stand 807A as best seen in FIG. 8D. Distal end portions of connecting rods 855, 857 attach to respective cross beams 859 of support stands 807C1, 807C2 at pivot connectors 854A. Pivot connectors 854A connect to cross beams 859 at a location offset from centerline 108 of the conveyor. In the preferred embodiments, support stands 807C1, 807C23 are respective first and second end support assemblies. In other embodiments, support stands 807C1, 807C2 are intermediate support stands. Support stands and pivot plates 813 are shown in phantom lines if the figure. Lateral drive components, omitted from FIGS. 8A, 8B, and 8C for clarity are shown in FIG. 8D. Conveyor belts and other components such as belt drive components shown in FIG. 1 are omitted for clarity.

Figure 8B:
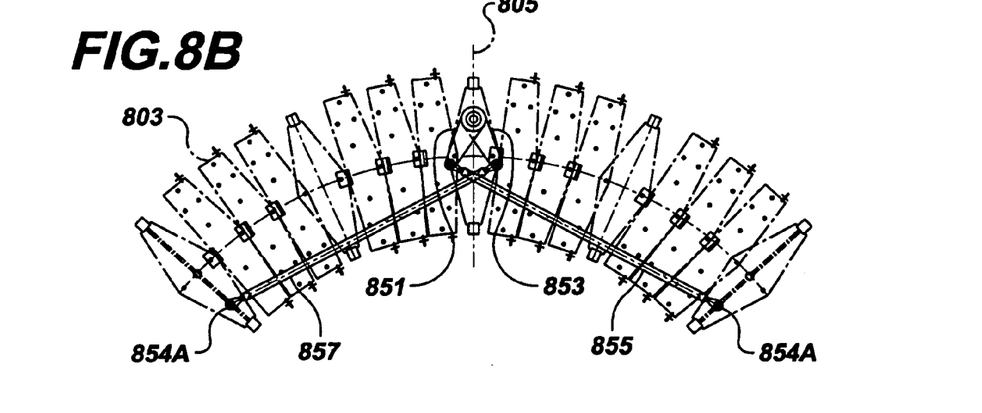
Figure 8C:
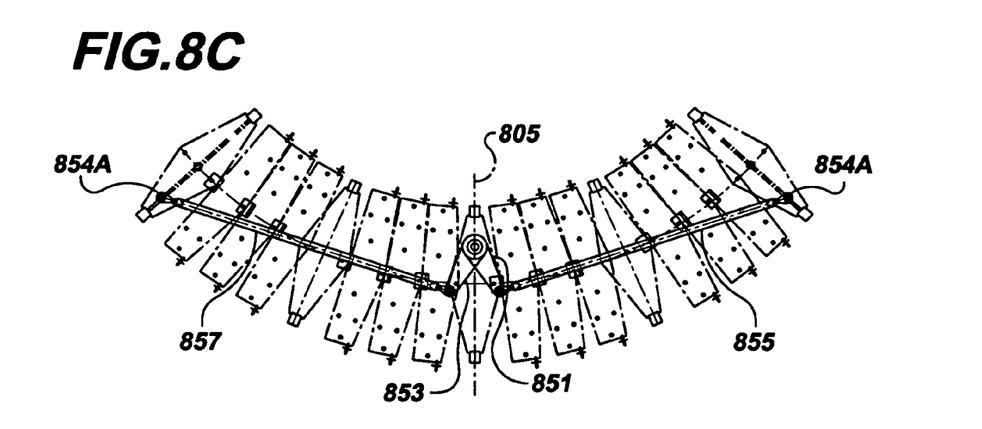
Figure 8D:
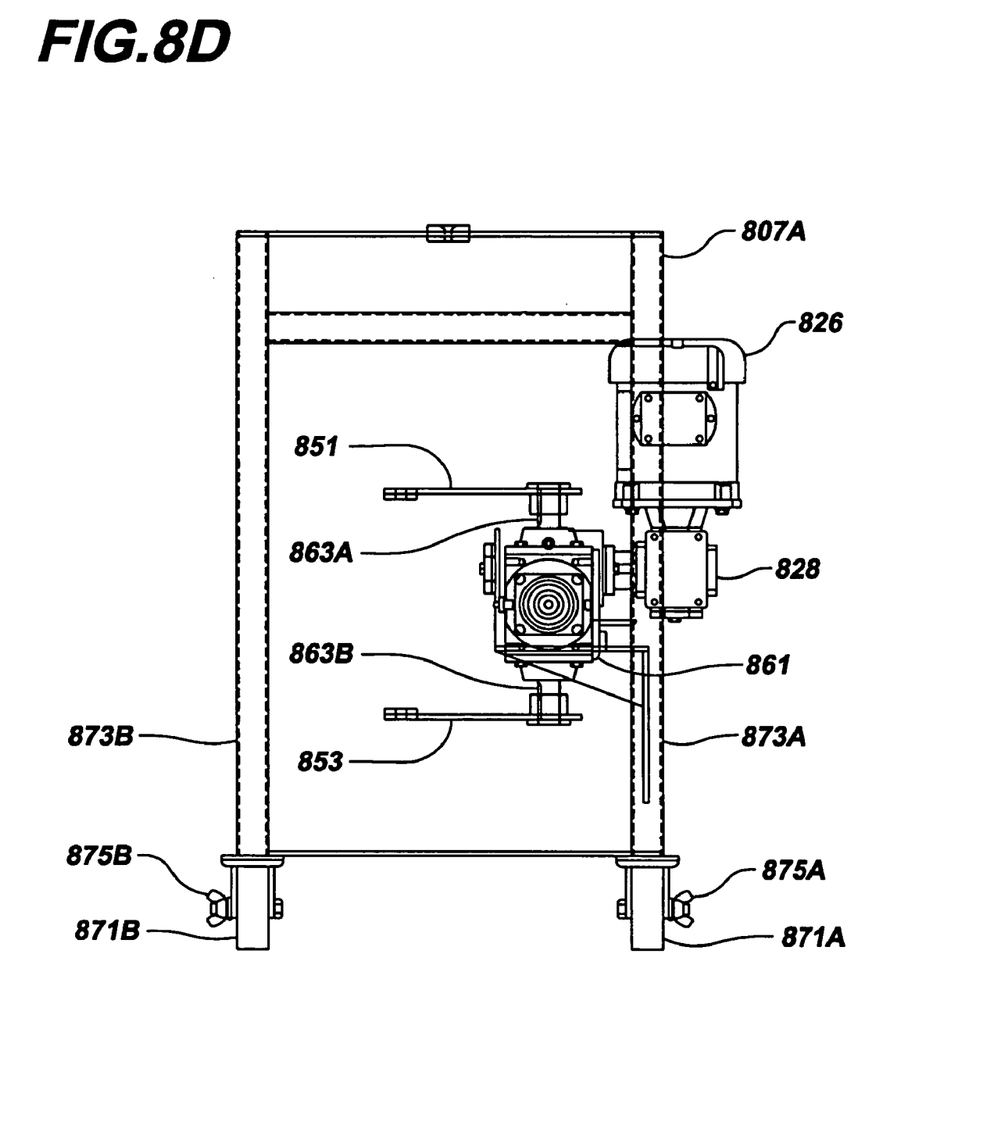
FIG. 8D is an elevation drawing showing the drive components of the lateral drive assembly of FIGS. 8A, 8B, and 8C.

FIG. 8B shows conveyor 801 with pivot arms 851, 853 counter rotated by differential gear 861 to pull connectors 854A of connecting rods 855, 857 towards centerline 805 of conveyor 801 so that side 803 forms a convex shape. Pivot arm 851 rotates counterclockwise about shaft 863A centerline and pivot arm 853 rotates clockwise about shaft 863B centerline. FIG. 8C shows conveyor 801 with pivot arms 851, 853 counter rotated in the opposite directions by differential gear 861 to push connectors 854A from centerline 805 of conveyor 801 so that side 803 forms a concave shape.

FIG. 8D is an end elevation drawing of center support stand 807A showing reversible drive motor 826 driving differential gear 861 via right angle gear unit 828. Pivot arms 851 and 853 are mounted to respective output shafts 863A, 863B of differential gear 861. Motor 826 may be an electric motor, or it may be a hydraulic or pneumatic motor. In other embodiments, a linear actuator such as a hydraulic cylinder may be used to actuate pivot arm 851 or 853, producing the counter rotating effect. In other embodiments, scissors type actuators, or other actuators known in the art provide the flexing motive power for the lateral adjustment assembly. Single actuators, or multiple actuators may be combined and used to position the conveyor.

In the preferred embodiments, castor wheels 871A, 871B, mounted to respective columns 873A, 873B, of each of the support stands allow positioning of the support stands during activation of the lateral adjustment assembly. A position locking mechanism, such as wheel locks 875A, 875B, provide a means to lock the desired position of conveyor 801. Use of wheel locks on each support stand allows initial positioning of the conveyor, locking one or more of the wheel locks, and repositioning the conveyor so that variable curvature and compound conveyor shapes are possible. In still other embodiments, conveyor 801 is positioned manually.

In the preferred embodiments, conveyor structural members such as columns, cross supports, pivot plates, and end assemblies are made of steel, aluminum, or other structural materials. Belt retainers may be made of plastics, metals, or ceramics that exhibit low sliding friction with the flexible belt, and have high abrasion resistance. In the preferred embodiments, high molecular weight polyethylene is used for the belt retainers.

In the preferred embodiments, flexible belt 105 is a modular flexible belt made of interlocking plastic members, such as series 2400 polypropylene Intralox® belt by Laitram LLC. In other embodiments, other flexible belts known in the art may be used. Lateral adjustment belts 104A, 140B may be made of plastic fabrics such as Telflon® or polypropylene.

Although the description above contains many specifications, these should not be construed as limiting the scope of the invention but merely providing illustrations of some of the presently preferred embodiments of this invention. For example, support plates of the support plate assembly may be connected by flexible joints, sliding joints or springs. The belt retainers may utilize rollers or wheels instead of sliding elements.

Rollers, casters or bottom pads may be attached to the bottom of support columns. Carriages or trucks may be used instead of support stands. Thus the scope of the invention should be determined by the appended claims and their legal equivalents, rather than by the examples given.

We claim:

1. A laterally adjustable conveyor for transporting material composing:
    a belt support assembly comprising a first end support assembly and a second end support assembly defining a longitudinal direction and a plurality of support plates pivotally connected by plate pivots and disposed between said first end support assembly and said second end support assembly each of said plurality of support plates comprising a belt support surface;
    a flexible belt disposed on said belt support assembly and engaging said belt support surfaces on said each of said support plates; and
    an intermediate support stand pivotally attached to said first end support assembly by a stand pivot and comprising a vertical support element vertically supporting said plurality of support plates from a conveyor support surface, said intermediate support stand comprising a means for lateral positioning on said conveyor support surface.

2. The conveyor of claim 1 wherein said first end support assembly comprises a motive means for positioning said second end support assembly laterally with respect to said first end support assembly.

3. The conveyor of claim 2 wherein said motive means for positioning said second end support assembly laterally with respect to said first end support assembly comprises a first lateral adjustment belt connected to said first end support assembly and said second end support assembly.

4. The conveyor of claim 2 wherein said motive means for positioning said second end support assembly laterally with respect to said first end support assembly comprises a first lateral adjustment belt connected to a first side of said first end support assembly and a first side of said second end support assembly and a second lateral adjustment belt connected to a second side of said first end support assembly and a second side of said second end support assembly.

5. The conveyor of claim 2 wherein said motive means comprises a first pivot arm fixed to a first support stand and a connecting rod pivotally connected between said pivot arm and a second support stand.

6. The conveyor of claim 2 wherein said motive means comprises a first pivot arm fixed to a first support stand and a first connecting rod pivotally connected between said first pivot arm and a second support stand and a second pivot arm fixed to said first support stand and a second connecting rod pivotally connected between said second pivot arm and a third support stand.

7. The conveyor of claim 6 wherein said first pivot arm and said second pivot arm are connected to respective shafts of a counter rotating drive assembly.

8. The conveyor of claim 1 comprising a first plate pivot connecting said first end support assembly and a first support plate and wherein said first support plate comprises an obtuse angled portion allowing a pivoting motion of a second support plate pivotally connected to said first support plate.

9. The conveyor of claim 1 comprising a first belt roller disposed on said first end support assembly and a second belt roller disposed on said second end support assembly.

10. The conveyor of claim 9 comprising a belt drive disposed on said first end support assembly and operably attached to said first roller, and wherein said first roller comprises cogs engaging segments of said flexible belt.

11. The conveyor of claim 1 wherein said means for lateral positioning on said conveyor support surface comprises a wheel disposed on said support stand.

12. The conveyor of claim 11 wherein said wheel comprises a wheel lock.

13. The conveyor of claim 1 comprising a second intermediate support stands, supporting a second plurality of support plates and said second support stand comprises a means to adjust a height of said second plurality of support plates above said conveyor support surface.

14. The conveyor of claim 1 wherein said belt support surface is provided by a support segment attached to each of said support plates.

15. The conveyor of claim 14 wherein said support segment is made of a low friction material.

16. The conveyor of claim 15 wherein said low friction material is a polyethylene.

17. The conveyor of claim 15 wherein said support segment comprises an L shaped cross section.

18. The conveyor of claim 1 wherein said belt support surface comprises a vertical belt support surface and a lateral belt support surface.

19. The conveyor of claim 18 wherein said lateral belt support surface comprises a low friction strip extending from said first end support assembly to said second end support assembly.

20. The conveyor of claim 19 wherein a plurality of said support plates comprises a sliding retaining member for laterally retaining said low friction strip allowing longitudinal movement of said low friction strip.

* * * * *